May 19, 1964
L. N. SHUPP
3,134,014
WELDING APPARATUS
Filed Dec. 13, 1961
3 Sheets-Sheet 1
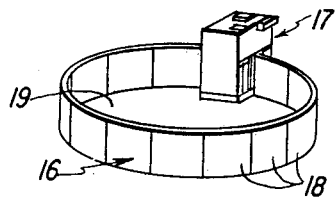
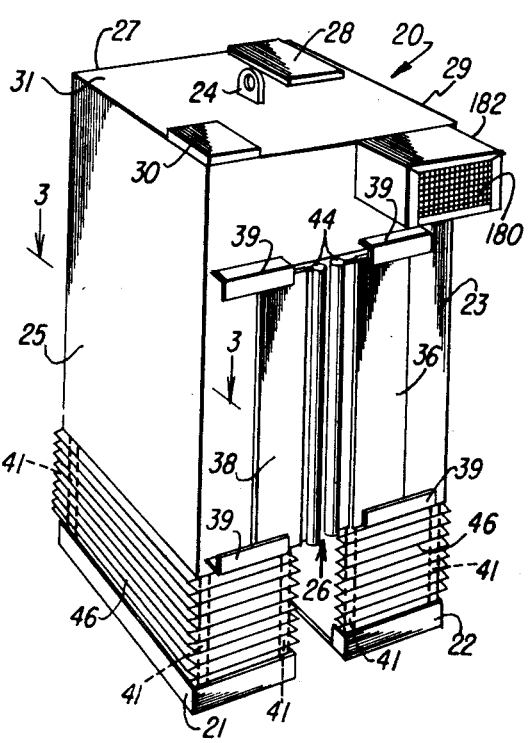
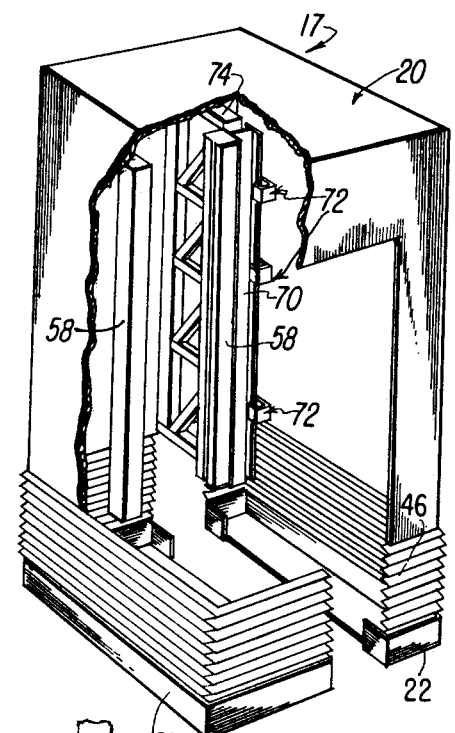
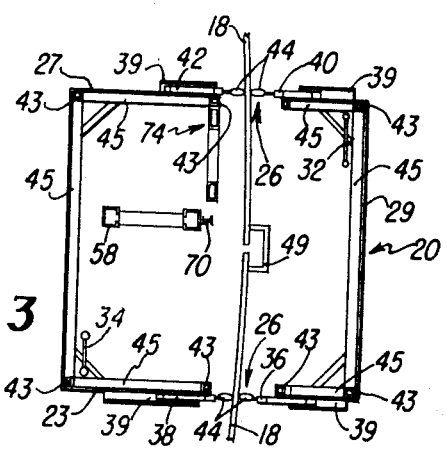
INVENTOR.
LAURENCE N. SHUPP
BY
Byron, Hume, Groen & Clement
ATTYS.

May 19, 1964

L. N. SHUPP 3,134,014

WELDING APPARATUS

Filed Dec. 13, 1961

INVENTOR.
LAURENCE N. SHUPP
BY
Byron, Hume, Groen & Clement
ATTYS.

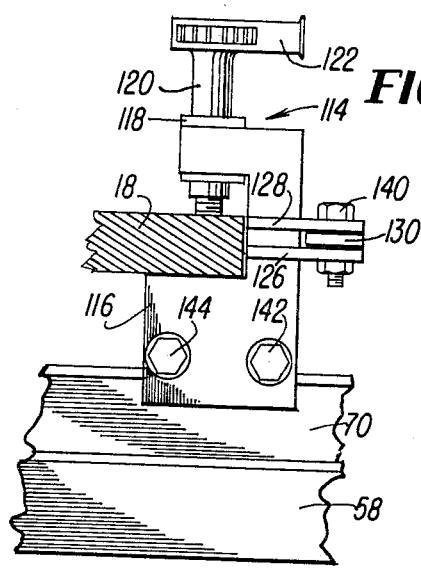
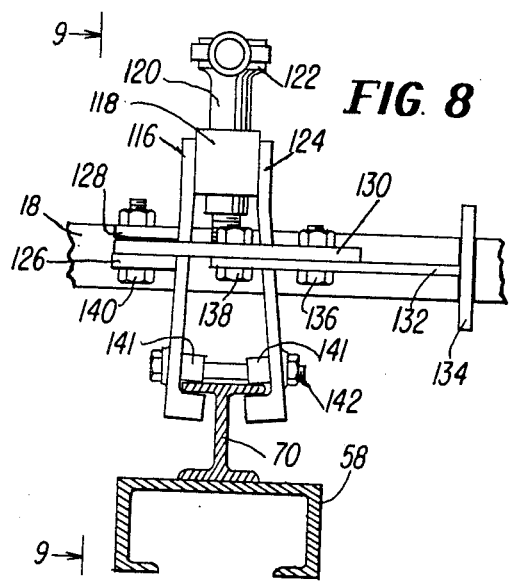
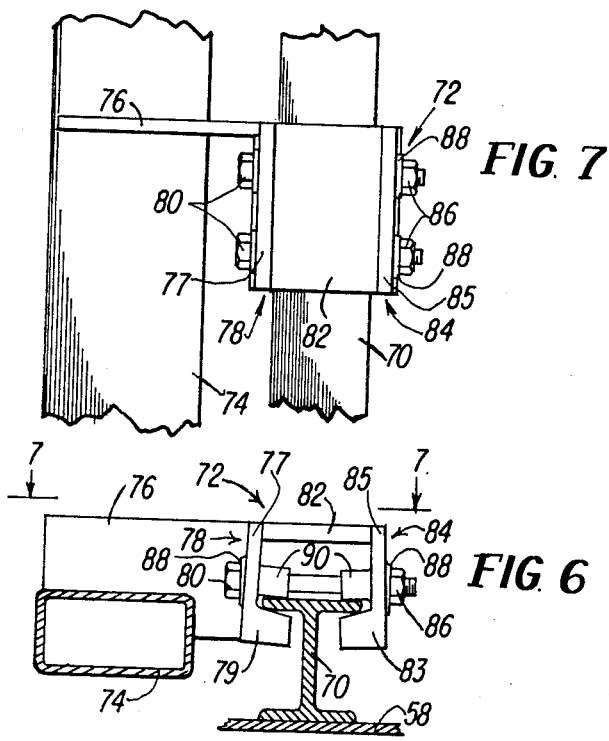
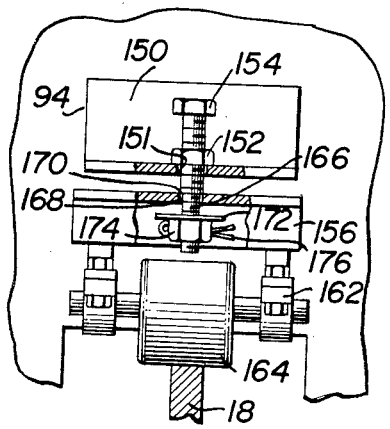

United States Patent Office 3,134,014
Patented May 19, 1964

3,134,014
WELDING APPARATUS
Laurence Shupp, Dyer, Ind., assignor to Union Tank Car Company, Chicago, Ill., a corporation of New Jersey
Filed Dec. 13, 1961, Ser. No. 159,081
12 Claims. (Cl. 219—126)

This invention relates to an apparatus for building storage tanks and the like and, more particularly, to apparatus for vertically welding the side members of a sidewall of the storage tank.

It is an object of the present invention to provide an apparatus for welding the vertical joints of the sidewall of a storage tank or the like.

It is another object of the present invention to provide for the sidewall of a storage tank a vertical welding apparatus which may be driven from one vertical joint to the other.

It is a further object of the present invention to provide a vertical welding apparatus that will automatically stop at the vertical joint to be welded.

It is a further object of the present invention to provide a vertical welding apparatus that may be adjusted and aligned with the vertical joint to be welded.

It is a further object of the present invention to provide a vertical welding apparatus that supports the welding equipment and operating personnel during the welding of the vertical joints in the sidewall of a storage tank or the like.

It is a further object of the present invention to provide a vertical welding apparatus wherein the operators may conveniently observe and regulate the welding operation.

It is a further object of the present invention to provide a vertical welding apparatus that will house the accessory equipment necessary for welding, such as the source of electricity, water, arc shielding gas and the like.

It is a further object of the present invention to provide a vertical welding apparatus adapted to exhaust the smoke and vapors that effuse from the welding process.

It is a further object of the present invention to provide a vertical welding apparatus that encloses the welding operation to prevent winds and the like outside the welding apparatus from disturbing a gas shield around the welding arc in the cage.

It is another object of the present invention to provide a vertical welding apparatus that encloses the welding operation to prevent winds and the like outside the cage from disturbing a gas shield around the welding arc within the cage and, additionally, that has suitable ventilation for the workmen inside the vertical welding apparatus.

These and other objects of the present invention, which will be more apparent hereinafter, are accomplished by a vertical welding apparatus embodying the features of the present invention. The welding apparatus is particularly adapted to weld vertical joints in a sidewall of a storage tank or the like. Briefly, the vertical welding apparatus comprises a cage having mounted therein a vertical welder. The cage rests upon and straddles the sidewall of the storage tank and is driven by suitable means to the vertical joint to be welded. The position of the cage may be adjusted to assure that the vertical welder is properly aligned with the vertical joint. The cage is adapted to permit the workmen operating the vertical welder to be in a position to readily see and control the welding operation. There is housed within the cage means which supply electricity, welding electrode wire, arc shielding gas and the like necessary for the welding operation. Furthermore, the interior of the cage is substantially sealed off from the atmosphere to prevent drafts which disrupt the welding operation and, in this connection, the cage is provided with a ventilation arrangement for the benefit of the workmen inside.

The invention, both as to its organization and method of operation, taken with further objects and advantages thereof, will best be understood by reference to the following description taken in conjunction with the accompanying drawings, in which:

FIG. 1 is a diagrammatic view of a vertical welding apparatus embodying the features of the present invention, illustrated as used in the erection of a storage tank or the like;

FIG. 2 is a perspective view of the vertical welding apparatus of FIG. 1;

FIG. 3 is a cross-sectional top plan view of the vertical welding apparatus taken along line 3—3 of FIG. 2;

FIG. 5 is a partially cut-away perspective view of the vertical welding apparatus of FIG. 1, illustrating a supporting structure for a vertical welder;

FIG. 6 is a fragmentary top-cross sectional view taken along line 6—6 of FIG. 4;

FIG. 7 is a side view taken along line 7—7 of FIG. 6;

FIG. 8 is a fragmentary top cross-sectional view taken along line 8—8 of FIG. 4;

FIG. 9 is a side view taken along line 9—9 of FIG. 8;

FIG. 10 is a side view of adjustment means embodied in the vertical welding apparatus of FIG. 1; and FIG. 11 is a front view of the adjustment means shown in FIG. 10 taken along line 11—11 of FIG. 10.

Figure 4:
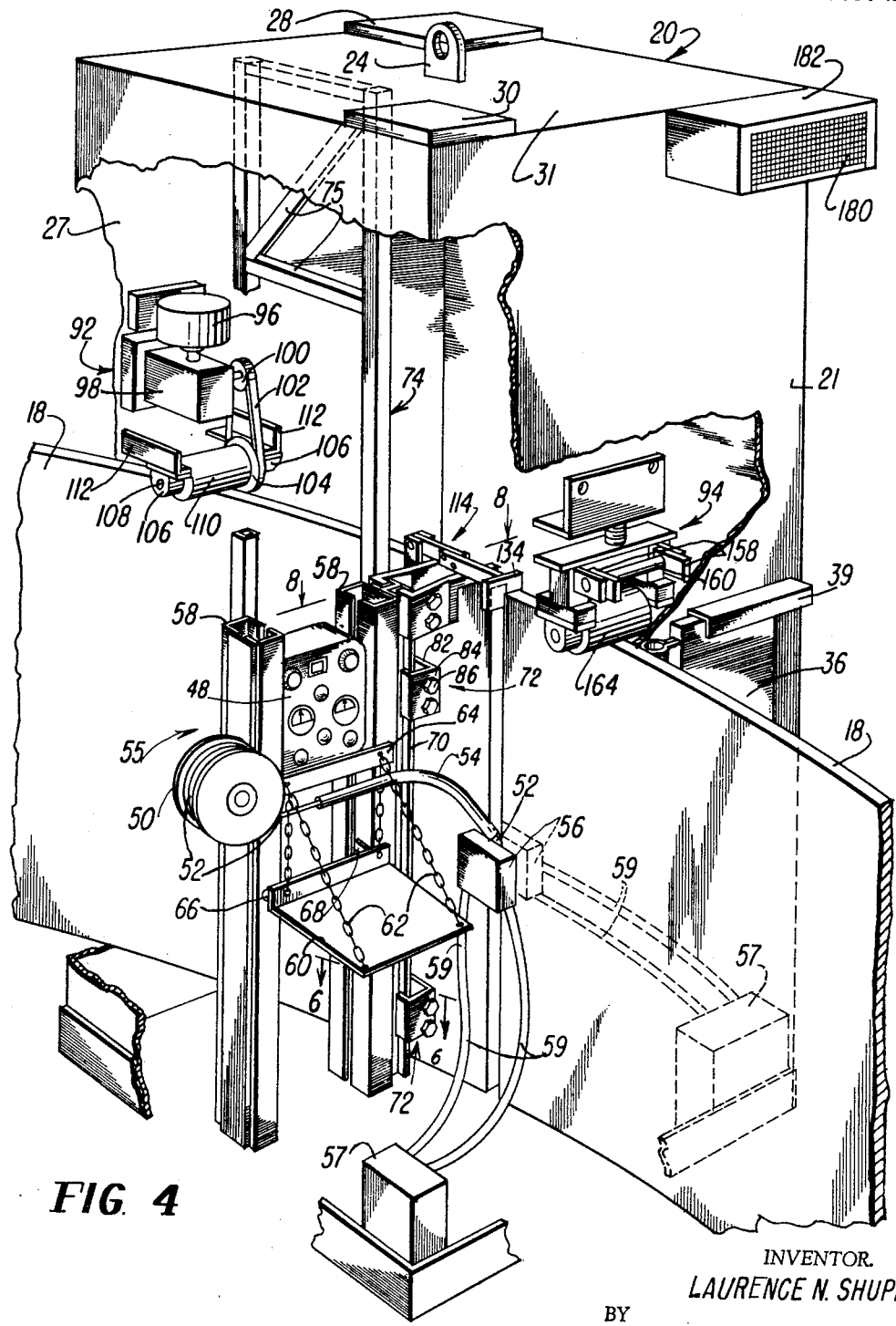
FIG. 4 is a partially cut-away perspective view of the vertical welding apparatus of FIG. 1, illustrating the apparatus in its welding position relative to a storage tank.

The vertical welding apparatus of the present invention has particular application in the construction of storage tanks or the like, and more specifically to a sidewall of a storage tank. Tank sidewalls are composed of many side members which are vertically welded to the adjacent side members and horizontally welded to those side members located above and below them in the sidewall. In the construction of a tank sidewall it is the customary practice to vertically weld together a first row of side members to form a circular wall. Then another row of side members is placed upon the first row and these side members are vertically welded to the adjacent side members in that row and horizontally welded to the side members in the row below. This process is continued until the sidewall is composed of sufficient rows of side members to provide a sidewall of the desired height.

The present vertical welding apparatus is adapted to perform the vertical welding requisite in each row of side members which comprise the sidewall of the tank. It is placed upon the side members after they have been positioned in a row and is removed after the requisite vertical welding in that row has been performed. After the next row of side members is positioned upon the row below, the welding apparatus of the present invention is placed thereon and ready to again perform its vertical welding operation.

Referring now to the drawings, and more particularly to FIG. 1, the vertical welding apparatus of the present invention is indicated generally by reference numeral 17. It is illustrated in position to weld spaced apart vertical joints of a lower row of side members 18, which is part of a sidewall 16 of a storage tank. In constructing the storage tank, vertical side members 18 are tack welded together and to a suitable floor 19, as shown in FIG. 1. The vertical side members 18 are steel plates which may be as high as 9 to 12 feet and can be any length, depending upon the size of the storage tank to be built. Upon this lower row of side members 18 is placed, by means of a crane or the like (not shown), the vertical welding apparatus 17. The vertical welding apparatus 17 straddles the sidewall 16 or side members 18 and is adapted to be driven around the sidewall 16 and weld the vertical joints between each of the side members 18. After welding the vertical joints in the bottom row of side members 18, the vertical welding apparatus 17 is removed and a second row of vertical side members 18 is formed by tack welding them on top of the bottom row. The vertical welding apparatus 17 is then placed upon, again in a straddling position, this second row of side members 18 and the vertical joints in this row are welded in the same manner the vertical joints in the bottom row were welded. This sequence of operation continues until the sidewall 16 is the desired height, which may require one or more rows of side members 18. After the last row is completed, the vertical welding apparatus 17 is removed from the sidewall. A roof may be secured to the sidewall by methods well known in the art.

As shown in FIG. 4, the vertical welding apparatus 17 comprises a welding cage 20 which houses a vertical welder 55 and the auxiliary equipment required by the welder. Within the welding cage 20 is a driving means 92 adapted to drive the cage 20 to and from each vertical joint. A positioning means 114 stops the welding cage 20 at the vertical joint to be welded and an alignment means 94 is adapted to properly align the vertical welder 55 with the joint to be welded. Furthermore, the welding cage 20 is provided with sealing means 44 (FIG. 2) whereby wind, gusts and the like outside the cage 20 do not create within the cage 20 air currents that interfere with the welding operation. The cage 20 is provided with a ventilating arrangement to assure that the workmen inside the cage are comfortable.

Considering now in more detail the welding cage 20, reference will be made to FIGS. 2 and 3. The cage 20 has four sides 23, 25, 27 and 29, two adjustable floors 21 and 22, and a roof 31. The sides 23, 25, 27 and 29 are attached by welding or the like to a cage frame suitably composed of vertically disposed frame members 43 and horizontally disposed bracing members 45 connected together by welding or other suitable means. The frame members 43 may be square metal pipes, as shown, circular metal pipes or the like. The bracing members 45 may also be metal pipes or small I-beams, channel irons or other suitable structural components. The cage frame is constructed such that the opposing sides of the cage 20 affixed thereto are substantially parallel and the adjacent sides of cage 20 are in substantially perpendicular planes. The sides 23 and 27 are vertically slotted at 26 to allow the cage 20 to straddle the sidewall 16 being constructed.

In order to provide sealing between the sidewall of the storage tank and the sides 23 and 27 when the cage 20 is straddling the sidewall, the side 23 has guides 39 in which are slidably mounted a pair of doors 36 and 38 and the side 27 has guides 39 in which are slidably mounted a pair of doors 40 and 42. These doors are slidably mounted such that a sealing means 44 on each of these doors engages side members 18 of the sidewall 16, as shown in FIG. 3. Each sealing means 44 is preferably made from a resilient material, for example, fabric, rubber or the like, which prevents wind, gusts and the like from entering the cage 20 between the sides 23 and 27 and the sidewall 16. The doors are held in their sealing positions by suitable latches, clamps or the like (not shown) which are operated from the interior of the cage 20. In this manner wind, gusts and the like from outside the cage 20 are prevented from entering the cage 20 and detrimentally affecting the welding operation as will be more apparent hereinafter.

The cage floors 21 and 22 are adjustably suspended from the cage 20 whereby the operators may stand on the floors and easily adjust and view the initial stages of the vertical welding process. The cage floors 21 and 22 extend longitudinally along sides 25 and 29 and transversely toward one another along sides 23 and 27. They are separated from one another by a distance substantially equal to the width of the slot 26 in the sides 23 and 25 in order that the cage 20 may straddle the sidewall 16 of the storage tank.

In connection with adjustably suspending the floors 21 and 22, each floor has four vertical extending rectangular pipes 41, one at each corner, each of which slide into the vertically disposed frame members 43 in the cage 20. Each of the pipes 41 has a plurality of transverse holes therethrough at different levels. Each frame member 43 has a transverse hole therein which is aligned with one of the transverse holes in the upwardly extending pipe 41 and a pin or the like placed through the aligned holes to secure the cage floors 21 and 22 at the desired level. The floors 21 and 22 may be lifted or lowered by means of chain falls or the like suitably secured to the inside of the cage 20 so that the operator can effect this adjustment of the floor level while standing on the floor.

It will be understood that the cage floors 21 and 22 may be adjustably suspended from cage 20 by many other means, such as clamps or the like. The particular means employed to adjustably suspend the floors is not, per se, part of the present invention.

In order to prevent wind and the like from entering the cage 20 between the sides 23, 25, 27 and 29 and the floors 21 and 22, flexible fabric, sheet rubber or plastic or the like 46 is connected to the bottom of the cage 20 and to the three exterior sides of the floors 21 and 22.

The roof 31 has manways 28 and 30 for the operators to enter the cage 20 from the top if desired. The operators may climb up from and down to the floors 21 and 22 of the cage upon ladders 32 and 34 (see FIG. 3) suitably aligned with the manways 30 and 28, respectively. This is necessary to attach lifting equipment to a lug 24 on the roof 31. Depending upon the position of the cage 20, the operators will enter the cage 20 through the slots 26 on the manways 30 and 28 and adjust the doors 36, 38, 40 and 42 in the manner and for the purpose described hereinbefore and then prepare the welding apparatus 55 for operation.

Secured to a bracing member (not shown) or to the roof 31 is a lug 24 which a crane or the like may hook to lift the cage 20 and to place it in a straddling position on the sidewall 16 of the storage tank.

As best seen in FIG. 4, the vertical welder 55 is positioned within the cage 20 and functions to weld the joints between the side members 18 of the tank. The vertical welder 55 is not, per se, part of the present invention and any known vertical welder may be employed in the present vertical welding apparatus. The vertical welder 55 seen in FIG. 4 is a "Vertomatic G Equipment for Electrogas Welding" manufactured by the Arco Corporation and is a gas shielded, flux-cored wire arc welder. The vertical welder 55 includes a control panel 48 from which the welding operation may be regulated. A feed spool 50, driven by means not shown in the drawing, supplies a welding rod 52 through a snorkel-type tube 54 to the midline of the joint to be welded between members 18. The welding rod 52 drops its molten weld metal into a mold formed on the joint by a pair of copper shoes 56 which cooperate with side members 18 as shown in FIG. 4. The rod 52 has a flux core whereby molten flux simultaneously flows on and down the weld and acts as an oxygen scavenger. Furthermore, the molten flux functions as a lubricant for the copper shoes 56 which are continually supplied with circulating cool water or the like from coolers 57 by lines 59 and which cool the weld as they travel upwardly with the vertical welder 55.

The actual welding is shielded by a gas, such as $CO_2$, to prevent air from reaching the molten weld metal, which would cause oxidation and porosity in the weld. Air currents or drafts within the cage are therefore undesirable as they would move the shielding gas away from the welding area and thereby permit air to contact the weld with resultant oxidation and porosity in the weld. The shielding gas is supplied by means (not shown) to the copper shoes 56 which, in turn, direct the shielding gas to the welding area.

The control panel 48 is mounted upon a vertical track 58 and it is adapted to be power driven vertically on the track 58 by means not shown. The feed spool 50, snorkel tube 54 and the copper shoes 56 are connected by means not pertinent to the present invention and not shown in FIG. 4 to the control panel 48 such that they move vertically with the panel 48 as it moves upon track 58 during the welding operation.

When the cage 20 has been placed upon the sidewall 16 and positioned to weld the vertical joint between side members 18, the vertical welder 55 is moved down the track 58 and the snorkel tube 54 adjusted so that it will supply weld metal centrally to the bottom of the vertical joint to be welded. The vertical welder 55 is then turned on and the welding commenced. During welding, the control box 48, feed spool 50, snorkel tube 54 and the copper shoes 56 move upwardly together.

A bar 64 attached to the control panel 48 supports a seat 60 which is attached thereto by chains 62. The operator sits upon the seat 60 and watches and controls the vertical welding operation as the welder 55 moves upwardly on the track 58. The seat 60 has a pair of wheels 66 which ride along the side of the track 58 and a pair of projecting guides 68 which slide along the opposing sides of track 58 to position the seat 60 during its vertical movement. In this manner, though the side members 18 to be welded may be substantially higher than the operator is tall, the seat 60 affords the operator an opportunity to continually be in a position to view the welding operation and make any adjustments necessary through control panel 48. As shown in FIG. 3 a plurality of U-shaped members 49 are tack welded to side members 18 to hold them in alignment. This also forms a ladder on the side of the wall opposite the vertical welder 55. A workman may climb this ladder to visually observe the side of the weld not in view to the operator of the welder 55 during the welding operation.

The vertical track 58 is mounted within the welding cage 20 in such a manner that, as will be seen from FIGS. 3 through 7, it may be moved vertically to permit welding side members 18 which may be larger or smaller than the length of the slot 26 in the sides 23 and 27 of the cage 20. In this connection, an I-beam 70, which is part of the track 58, is secured by a plurality of clamps, indicated generally by reference numeral 72, to a vertically extending support member 74 which is suitably attached to the cage 20 by welding or the like. The support member 74 extends vertically from the roof 31 to the bottom level of the sides 23, 25, 27 and 29 and transversely from the side 27 of the cage 20. As shown in FIG. 3 it may be attached along the side 27 to a vertically disposed frame member 43. It has suitable struts or bracing members 75 to insure its rigidity.

Referring now to FIGS. 6 and 7, each clamp 72 is fixedly supported from the support member 74 and, to this end, includes a plate 76, one end of which is welded to the support member 74. The other end of the plate 76 is welded to an upwardly extending L-shaped member 78 having legs 77 and 79, the leg 77 having two holes to receive a pair of bolts 80. An upwardly extending bracing member 82 is welded transversely to the end of the leg 77 of the L-shaped member 78. A flange of the I-beam 70 is held by the L-shaped member 78 and a cooperating L-shaped member 84 having legs 83 and 85, the latter having two holes to receive the bolts 80. The free end of leg 85 abuts the vertical member 82. The bolts 80, having associated bevel washers 88, pass through the aligned holes in the legs 77 and 85 of the L-shaped members 78, and 84, respectively, and with a pair of nuts 86 tightly secure the L-shaped members 84 and 78 to a flange of the I-beam 70 and thereby fix its position with respect to the support member 74. A pair of square lugs or sleeves 90 are welded respectively to 78 and 84 and assist in rigidly securing the flange of the I-beam 70 between members 78 and 84. The bracket 72 may be loosened by rotating the nuts 86 such that the vertical track 58 and I-beam 70 may be moved together upwardly or downwardly depending upon the particular position desired for the vertical welder 55. This upward or downward movement of the track 58 and I-beam 70 may be assisted by a chain fall or the like suitably positioned within the cage 20.

During the welding of the bottom row of side members 18, the floors 21 and 22 of the cage 20 are telescoped into the cage 20 as far as they will go, i.e., wherein the floors 21 and 22 contact the bottom of all the sides 23, 25, 27 and 29 of the cage 20. The track 58 is positioned such that its bottom is upon the floor 21 whereby the vertical welder 55 at its lowermost position in the track 58 just contacts the bottom of the vertical joint to be welded. Of course, in this instance, the operator to view the welding operation and to position and adjust the vertical welder must bend or kneel over the welder 55 until it has reached a sufficient height for him to sit upon the seat 60 and ride upwardly with the vertical welder 55 as it completes the vertical weld. When the next row of vertical side members 18 forming the sidewall 16 of the storage tank are in position to be vertically welded, the floors 21 and 22 are adjustably lowered, in the manner described hereinbefore, so that they are at a level below the bottom of the vertical joints between the side members 18. In this manner, the operator may stand upright on the floor 21 of the cage 20 while adjusting and preparing the welding apparatus 55 for the welding operation. Thus the adjustably suspended floors 21 and 22 permit the operator to initially position and adjust the welder 55 at a height convenient to him. After preparing and adjusting the vertical welder 55, the operator climbs on the seat 60 and rides upwardly with the vertical welder as it performs the vertical welding operation for the second row of vertical members. This sequence is continued as the third, fourth and fifth rows and the like are installed to form the sidewall 16 of the storage tank. Furthermore, the vertical track 58 may be lowered by loosening clamps 72 to allow the vertical track 58 to slide downwardly upon the support 74 such that it will extend below the bottom of the sides 23 and 27 to weld a side member 18 higher than the height of the slot 26 in these sides.

The driving means 92 and the alignment means 94 support the welding cage 20 upon the side members 18 of the sidewall 16 as may be seen in FIG. 4. The driving means 92, which by means of a drive wheel 110 also moves the cage 20 along the sidewall to the vertical joints to be welded, comprises a motor 96 suitably connected to a gear reduction box 98 having an extending shaft upon which a pulley 100 is secured. The motor 96 through pulley 100 drives a V-belt 102 which cooperates with a pulley 104 attached to a shaft 108. Brackets 112 attached to the side 27 of the cage 20 support bearings 106 in which the shaft 108 rotates. The shaft 108 has thereon the drive wheel 110 which rests upon the upper edge of the side members 18. The motor 96 translates power through the gear box 98 via the V-belt 102 to the drive wheel 110 which moves the cage 20 along the top of the side members 18. The on-off switch for the motor is located on the control panel 48 for the convenience of the operator. The alignment means 94, which supports the other side of the cage 20, will be described in more detail hereinafter.

The positioning device 114 is illustrated in FIGS. 4, 8 and 9. While drive wheel 110 is moving the cage along the tank sidewall and just prior to its reaching the vertical joint to be welded, the motor 96 is turned off and the cage allowed to coast into position. A guide finger 134 on the positioning means 114 drops into the vertical joint and stops the cage 20 at the vertical joint.

The positioning device 114 is clamped upon the I-beam 70 by means of substantially L-shaped members 116 and 124 which grip a flange of the I-beam 70 and are held in place by nut and bolt combinations 142 and 144. Small sleeves 141 are welded on the L-shaped members 116 and 124 and assist in maintaining the positioning device 114 on the I-beam 70 in proper position by forming, with the members 116 and 124, wedges about a flange of the I-beam 70. The L-shaped member 116 has welded thereto a block 118 which is threadably bored to receive a bolt 120 having a handle 122 by which it is rotated. A pair of vertically extending members 126 and 128 are welded to and extend upwardly from the L-shaped member 124 and receive a nut and bolt combination 140. An arm member 130 is pivotally mounted upon the nut and bolt combination 140. The arm member 130 is connected via two nut and bolt combinations 136 and 138 to an arm extension 132 which is connected to the vertically disposed guide finger 134. The arms 130 and 132 and the guide finger 134 pivot as a single element about the nut and bolt combination 140.

As the cage 20 is moving toward the next vertical joint to be welded, the guide finger 134 slides upon the top of the vertical members 18. When the operator sees that the guide finger 134 is close to the next vertical joint, he turns off the motor 96 and allows the cage 20 to coast toward this vertical joint. When the guide finger 134 reaches the vertical joint it falls into the joint and thereby stops the cage 20 at the joint.

After proper alignment has been effected via means 94, in a manner described in more detail hereinafter, the cage is held in this position by rotating bolt 120 with the handle 122 until the bolt 120 contacts the side member 18. In this manner the cage 20 is clamped to the sidewall 16 to prevent any movement of the cage during the welding operation. The arms 132 and 130 of the locking and positioning device 114 are then moved upwardly and out of the joint to be welded. The joint is then clear and the welder 55 may then perform the vertical weld to the top of the joint.

It will be understood that the guide finger 134 of the positioning means 114 will fall into the vertical joint and stop the cage 20 whether the cage 20 is traveling in a clockwise or counterclockwise direction.

The alignment means 94 is illustrated in FIGS. 4, 10 and 11 and is to vertically position the cage after it has been moved to the vertical joint to be welded. By vertically moving an idler wheel 164, the cage 20 is placed in proper vertical alignment with the joint so that during the entire welding operation the welder 55 will be aligned with the joint.

The alignment means 94 comprises a bracket 150 secured to the side 21 of the cage 20. The bracket 150 has a hole 151 in its horizontally disposed leg and a nut 152 secured thereto by welding or the like in alignment with the hole 151. A bolt 154 threadedly engages and extends downwardly through nut 152. The end of the bolt has a section of reduced diameter 166 which is threaded also and extends through an oversize hole 168 in a support member 156 which is pivotally mounted upon a pin 160 supported on the side 23 by means of brackets 158 (see FIG. 4). As the hole 168 is not as large as the diameter of the main portion of bolt 154, an annular surface 170 between the end of bolt 154 and the section of reduced diameter 166 contacts the support member 156 and provides for its movement. Below the support member 156 a washer 172 is held in place on the section 166 by a nut 174 which threadedly engages the section 166. A cotter pin 176 extends through the nut 174 and the section 166 to assure that the nut 174 is not rotated due to the rotation of the bolt 154. Secured to support 156 are a pair of bearings 162 which are adapted to support the rotatable idler wheel 164.

Rotation of the bolt 154 causes the support member 156, and therefore idler wheel 164, to pivot about the pin 160. In this manner the cage is lifted or lowered slightly along the side 23 to align the cage 20 and vertical welder 55 with the joint to be welded. This prevents the need for re-adjustment of the position of the welder 55 during the welding operation.

As the present vertical welding apparatus substantially eliminates outside wind, gusts and the like from entering the interior of the cage 20, the air inside the cage 20 will naturally become stagnant unless some ventilating arrangement is provided in the cage 20. For this purpose, as shown in FIGS. 2 and 4, an air conditioner 180 is placed in a small duct 182 of the cage 20. The air conditioner 180 draws air into the cage 20 and cools and distributes it. The air conditioner 180 and the coolers 57 may, of course, be consolidated into one unit. Since it is impossible to provide a complete seal around the cage 20, this arrangement also forces out the smoke evolving during the welding operation. However, if it is desired to provide additional means for this purpose, an exhaust fan is placed in the upper portion of the cage. The air conditioner 180, rather than an intake fan, is generally preferred as it improves the working conditions within the cage.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A vertical welding apparatus adapted to weld vertical joints between the side members of a storage tank or the like which comprises a substantially air-tight enclosed cage straddling said side members, said cage supporting therein a gas shielded, vertical welder, driving means within said cage, said driving means supporting said cage upon said side members.

2. The welding apparatus of claim 1 wherein said cage has doors slidably mounted thereon, said doors engaging said side members during the welding operation to reduce the flow of air into said cage between said cage and said side members.

3. A welding apparatus including a gas-shielded, vertical welder for welding vertical joints between side members of a storage tank or the like, which apparatus comprises a substantially enclosed cage straddling said side members, said vertical welder being mounted within said cage, doors slidably mounted upon said cage, said doors having sealing means thereon which contact said side members during welding to reduce the flow of air into said cage between said cage and said side members, and ventilation means associated with said cage to provide controlled circulation of air within said cage.

4. A welding apparatus including a gas-shielded, vertical welder for welding vertical joints between side members of a storage tank or the like, which apparatus comprises a substantially enclosed cage straddling said side members, said cage having two floors, one on each side of said side members, said floors being extendable downwardly from said cage, sealing means connected to said cage and said floors of said cage, said vertical welder being mounted within said cage, doors slidably mounted upon said cage and contacting said side members during welding to reduce the flow of air into said cage between said cage and said side members, and ventilation means associated with said cage to provide controlled circulation of air within said cage.

5. The welding apparatus of claim 1 wherein a positioning device is mounted within said cage, said positioning device including a guide finger which falls into the vertical joint to be welded to stop said cage and vertical welder at said vertical joint.

6. The welding apparatus of claim 1 wherein a vertical frame support member is mounted within said cage, said vertical welder having a track adjustably secured to said support member whereby said track may be raised or lowered depending upon the height of said side members being welded.

7. The welding apparatus of claim 6 wherein said vertical welder has a seat attached thereto, said seat cooperating with said vertical track to move upwardly and downwardly with said vertical welder.

8. The vertical welding apparatus of claim 1 wherein said cage has mounted therein an alignment means which comprises an idler wheel which rests upon the top of the side members, said idler wheel being rotatably held by a support member, said support member being pivotally mounted upon said cage, and an adjustment member connected to said support member to pivotally move said support member, and thereby said idler wheel, whereby vertical alignment of said cage and welder with said vertical joint is effected.

9. A vertical welding apparatus for welding vertical joints in a sidewall of a storage tank or the like which comprises a gas shielded, vertical arc welder, said vertical welder having liquid-cooled shoes for solidifying the weld, said vertical welder being mounted within a substantially air-tight, enclosed cage which straddles said sidewall, drive means for said cage supporting said cage upon said side members, means to provide cooled air to the interior of said cage, said cool air means also supplying cool liquid to said shoes.

10. A vertical welding apparatus for welding vertical joints between side members of a storage tank or the like which comprises a substantially air-tight, enclosed cage straddling said side members, said cage having a vertically extending frame support therein, a gas shielded, vertical arc welder having a track for movement thereon, clamping means for adjustably securing said track to said frame support, and means associated with said cage for providing controlled ventilation therein.

11. The vertical welding apparatus of claim 10 wherein a positioning device is connected to said track, said positioning device including a downwardly extending guide finger which rides along the top of said side member when said cage is being moved, said guide finger being adapted to fall into the vertical joint and stop said cage whereby said vertical welder is properly aligned with said vertical joint.

12. A vertical welding apparatus adapted to weld vertical joints between the side members of a storage tank or the like which comprises a substantially air-tight, enclosed cage having mounted therein a gas shielded, vertical arc welder, said cage straddling said side members, and having four sidewalls and a roof, a first and second of said sidewalls having vertically extending openings therein through which said side members extend, a pair of opposing, slidable doors mounted on each of said first and second sidewalls, said doors having sealing means thereon which are moved into contact with said side members during welding, two floors adjustably suspended from said cage on opposite sides of said side members, a flexible material associated with said floors and said sidewalls to prevent air from flowing between said sidewalls and floors, and means associated with said cage for ventilation thereof.

References Cited in the file of this patent

UNITED STATES PATENTS

| 2,737,565 | Meyer | Mar. 6, 1952 |
| 2,755,367 | Costello | July 17, 1956 |
| 2,806,935 | Meyer | Sept. 17, 1957 |

OTHER REFERENCES

"Welding Journal," July 1954, pp. 651–659.